US011918523B2

(12) United States Patent
Zertuche et al.

(10) Patent No.: US 11,918,523 B2
(45) Date of Patent: Mar. 5, 2024

(54) CHILD ENTERTAINMENT ASSEMBLY

(71) Applicants: Georganna Zertuche, Eloy, AZ (US); Daniel Cady, Eloy, AZ (US)

(72) Inventors: Georganna Zertuche, Eloy, AZ (US); Daniel Cady, Eloy, AZ (US)

( * ) Notice: Subject to any disclaimer, the term of this patent is extended or adjusted under 35 U.S.C. 154(b) by 472 days.

(21) Appl. No.: 17/210,577

(22) Filed: Mar. 24, 2021

(65) Prior Publication Data

US 2022/0304872 A1 Sep. 29, 2022

(51) Int. Cl.
*A63H 33/00* (2006.01)
*A61G 5/10* (2006.01)

(52) U.S. Cl.
CPC ............. *A61G 5/10* (2013.01); *A63H 33/006* (2013.01)

(58) Field of Classification Search
CPC . A61G 5/00; A61G 5/10; A63H 33/00; A63H 33/006
USPC ..... 446/227, 330; 297/188.01, 188.2, 188.21
See application file for complete search history.

(56) References Cited

U.S. PATENT DOCUMENTS 1,265,682 A * 5/1918 Larsen ................. A63H 33/006 D21/467
1,318,024 A * 10/1919 Sullivan ............... A63H 33/006 446/227
1,436,367 A * 11/1922 Sullivan ............... A63H 33/006 446/227
2,282,881 A * 5/1942 Ostrow ................ A63H 33/006 248/908
2,402,861 A * 6/1946 Winnick .............. A63H 33/006 297/148
2,628,666 A * 2/1953 Hall ....................... A47D 15/00 297/118
2,723,856 A * 11/1955 Thomson ............. A63H 33/006 482/130
2,736,131 A * 2/1956 Thomson ................. A63H 3/50 5/503.1
2,858,641 A * 11/1958 Trimble ............... A63H 33/006 108/29
3,014,307 A * 12/1961 Dupuis ................ A63H 33/006 D21/467
3,184,883 A * 5/1965 McCook .............. A63H 33/006 446/28
3,204,367 A * 9/1965 Stubbmann ............ A63H 33/00 248/302
3,238,661 A * 3/1966 Herer ..................... A63H 13/12 446/28
(Continued)

FOREIGN PATENT DOCUMENTS

WO WO0205917 1/2002

*Primary Examiner* — Alexander R Niconovich

(57) ABSTRACT

A child entertainment assembly for mounting toys to a wheelchair includes a frame that is mountable to a wheelchair to extend over a child that is seated in the wheelchair. A pair of clamps is each of the clamps is coupled to the frame for mounting the frame on the wheelchair. A winch is rotatably integrated into the frame and a plurality of cables is each coupled to the winch. A plurality of toys is each coupled to a respective one of the cables such that each of the toys is accessible to the child that is seated in the wheelchair. Each of the toys is drawn upwardly toward the central member when the winch is rotated in a first direction. Conversely, each of the toys is lowered from the central member when the winch is rotated in a second direction.

10 Claims, 5 Drawing Sheets

(56) References Cited

U.S. PATENT DOCUMENTS

| | | | | | |
|---|---|---|---|---|---|
| 3,721,414 | A * | 3/1973 | Yoder | A63H 33/006 248/175 |
| 4,188,745 | A * | 2/1980 | Harvey | A63H 33/006 446/227 |
| 4,561,549 | A * | 12/1985 | Yokohori | A47D 15/00 248/105 |
| 4,627,588 | A * | 12/1986 | Block | F16M 13/00 248/105 |
| 4,664,640 | A * | 5/1987 | Shindo | A63H 33/006 446/229 |
| 4,702,719 | A * | 10/1987 | Lapid | A63H 33/006 16/374 |
| 4,722,713 | A * | 2/1988 | Williams | A63H 33/006 248/102 |
| 5,076,520 | A * | 12/1991 | Bro | A63H 33/006 248/165 |
| 5,478,268 | A * | 12/1995 | Au | A63H 33/006 446/397 |
| 6,068,285 | A * | 5/2000 | Jackson | B62B 9/20 297/217.3 |
| 6,113,455 | A * | 9/2000 | Whelan | A63H 33/006 248/214 |
| 6,203,395 | B1 * | 3/2001 | McElhaney | A63H 33/006 446/175 |
| 6,386,490 | B1 * | 5/2002 | Suh | A61J 9/0661 248/104 |
| 6,629,727 | B2 * | 10/2003 | Asbach | B60N 2/2821 297/188.21 |
| 6,640,985 | B1 * | 11/2003 | Cheng | A63H 33/006 211/118 |
| 6,702,643 | B1 * | 3/2004 | Drosendahl | A63H 33/006 446/175 |
| 6,705,950 | B2 * | 3/2004 | Wood | A63H 33/006 446/227 |
| 6,742,749 | B2 * | 6/2004 | Kassai | A63H 33/003 297/448.1 |
| 6,860,786 | B2 * | 3/2005 | Oren | A63H 33/006 446/227 |
| 7,037,170 | B2 * | 5/2006 | Pacella | A63H 33/006 446/268 |
| 7,247,078 | B2 * | 7/2007 | Bapst | A63H 33/006 446/322 |
| 7,264,534 | B2 * | 9/2007 | Stubenfoll | A63H 33/006 446/330 |
| RE41,121 | E * | 2/2010 | Asbach | B60N 2/2821 297/188.21 |
| 8,070,552 | B2 * | 12/2011 | Snyder | A63H 33/006 446/268 |
| 8,322,789 | B2 * | 12/2012 | Mendes | A47D 15/00 297/274 |
| 8,460,053 | B2 * | 6/2013 | Fair | B62B 9/26 5/655 |
| 8,678,942 | B2 * | 3/2014 | Zhang | A47D 13/105 297/184.15 |
| 8,696,400 | B2 * | 4/2014 | Fair | B62B 5/082 24/581.1 |
| 8,771,033 | B2 * | 7/2014 | Goszewski | A63H 33/006 446/227 |
| D775,693 | S | 1/2017 | Elson | |
| 9,585,495 | B2 * | 3/2017 | Gottsleben | A63H 33/006 |
| 9,757,660 | B2 * | 9/2017 | Leibovics | F16M 13/04 |
| 9,776,098 | B2 * | 10/2017 | Fair | A63H 33/006 |
| 9,821,240 | B2 * | 11/2017 | Hansen | A63H 33/006 |
| 10,414,425 | B2 * | 9/2019 | Nix | B62B 9/26 |
| 2002/0163230 | A1 * | 11/2002 | Suh | A61G 5/10 297/146 |
| 2003/0199329 | A1 * | 10/2003 | Wood | A47D 1/002 472/119 |
| 2004/0242118 | A1 * | 12/2004 | Schreiber-Setzemski | A63H 33/006 446/227 |
| 2005/0172411 | A1 * | 8/2005 | Snedeker | A47D 13/027 5/655 |
| 2006/0052172 | A1 * | 3/2006 | Stephen | A63H 33/006 472/135 |
| 2015/0335150 | A1 * | 11/2015 | Frisby | A63H 33/006 211/207 |
| 2017/0368465 | A1 * | 12/2017 | Brown | A63H 33/006 |

* cited by examiner

CHILD ENTERTAINMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to entertainment devices and more particularly pertains to a new entertainment device for mounting toys to a wheelchair. The device includes a pair of pivotable arms, a winch, and a plurality of toys suspended from the winch. The pivotable arms are mountable to the wheelchair thereby facilitating the toys to be accessible to the child.

(2) Description of Related Art Including Information Disclosed Under 37 CFR 1.97 and 1.98

The prior art relates to entertainment devices including a frame with pivotable members for suspending toys for a child to play with. The prior art discloses a frame that is attached to a handle of a wheelchair for suspending toys therefrom. The prior art discloses a plurality of brackets that are attachable to child care equipment for suspending toys therefrom. The prior art discloses a variety of frames that include curved members which are pivotally coupled together for suspending toys therefrom.

BRIEF SUMMARY OF THE INVENTION

An embodiment of the disclosure meets the needs presented above by generally comprising a frame that is mountable to a wheelchair to extend over a child that is seated in the wheelchair. A pair of clamps is each of the clamps is coupled to the frame for mounting the frame on the wheelchair. A winch is rotatably integrated into the frame and a plurality of cables is each coupled to the winch. A plurality of toys is each coupled to a respective one of the cables such that each of the toys is accessible to the child that is seated in the wheelchair. Each of the toys is drawn upwardly toward the central member when the winch is rotated in a first direction. Conversely, each of the toys is lowered from the central member when the winch is rotated in a second direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
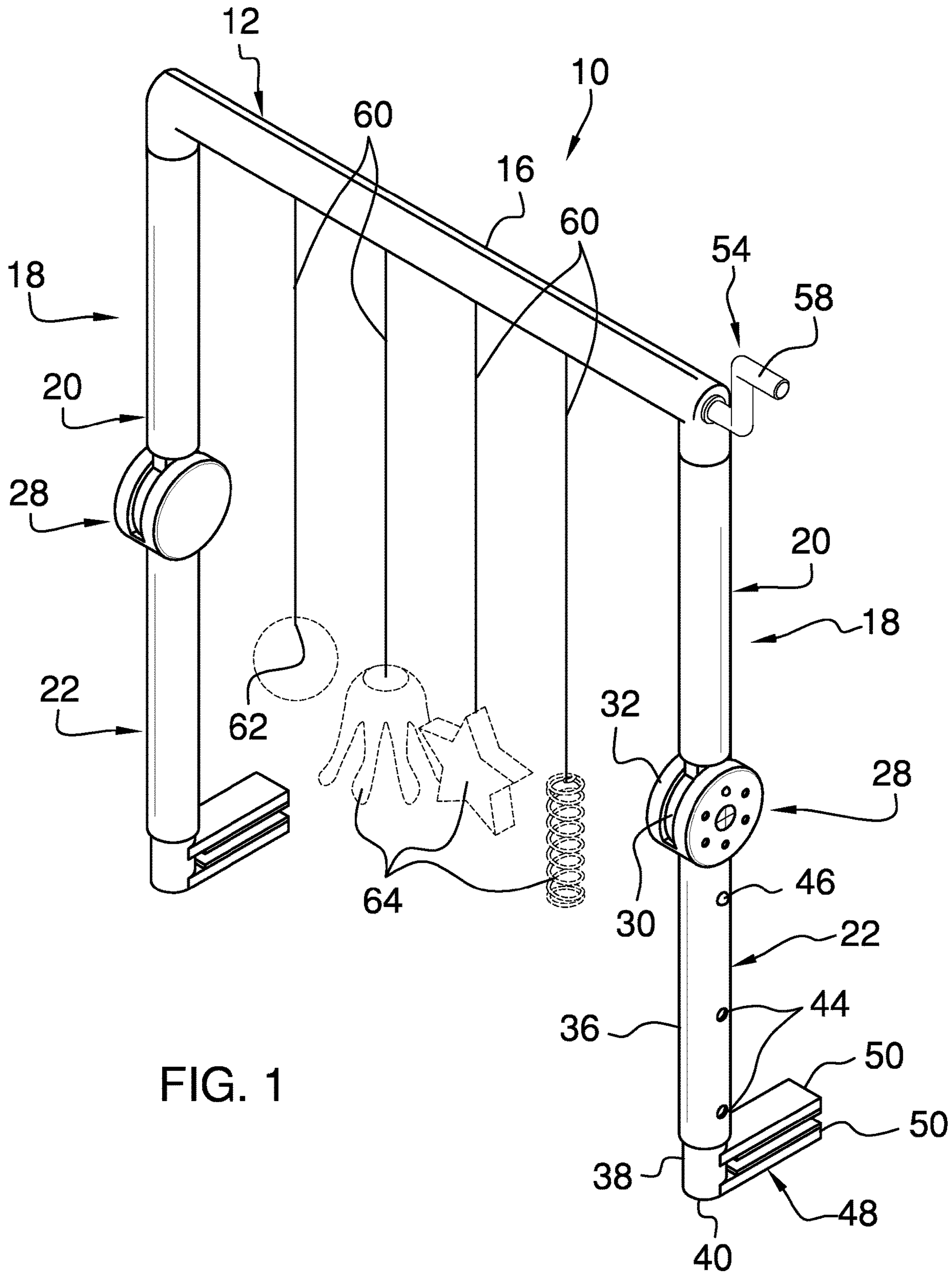
FIG. 1 is a perspective view of a child entertainment assembly according to an embodiment of the disclosure.
Figure 2:
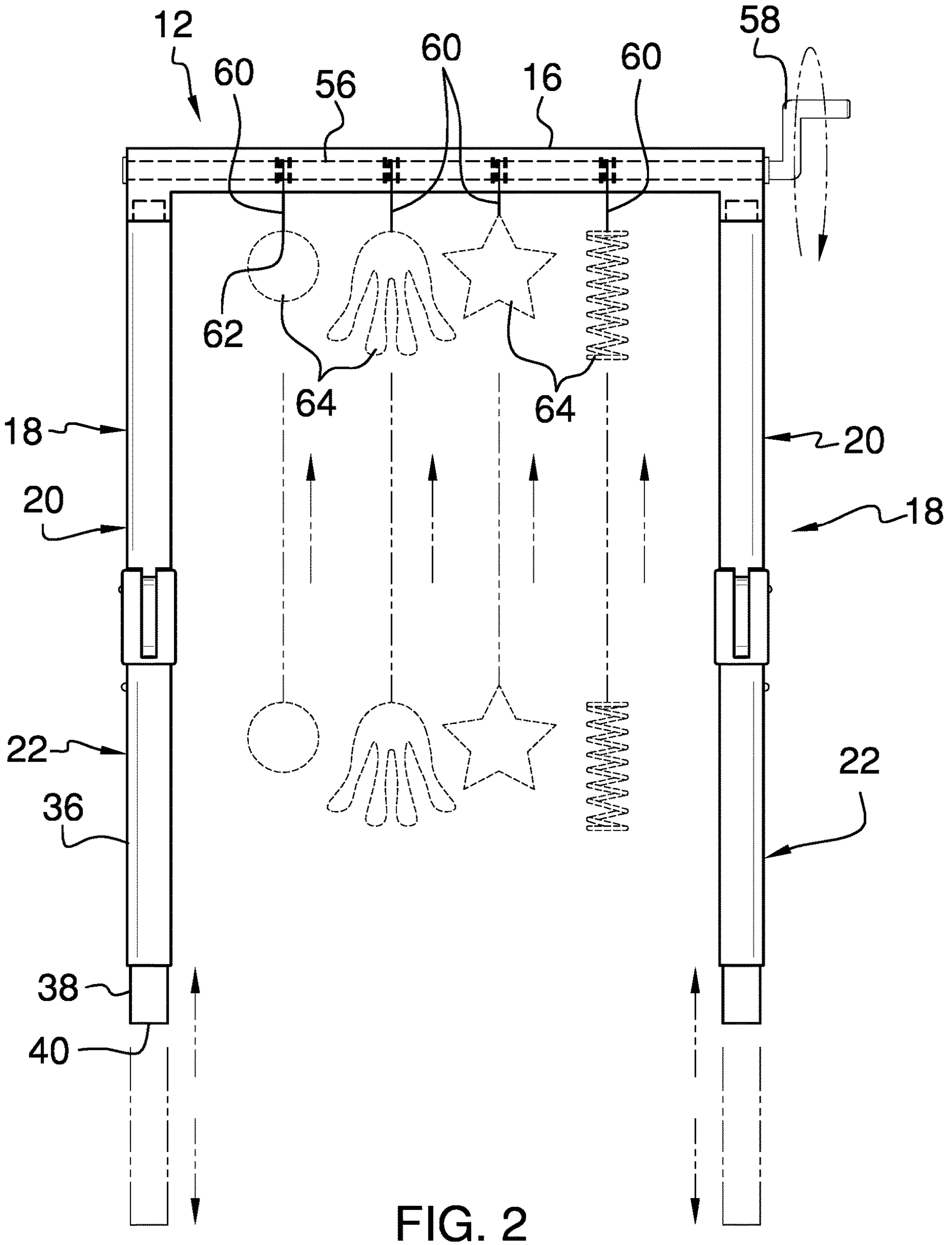
FIG. 2 is a front view of an embodiment of the disclosure.
Figure 3:
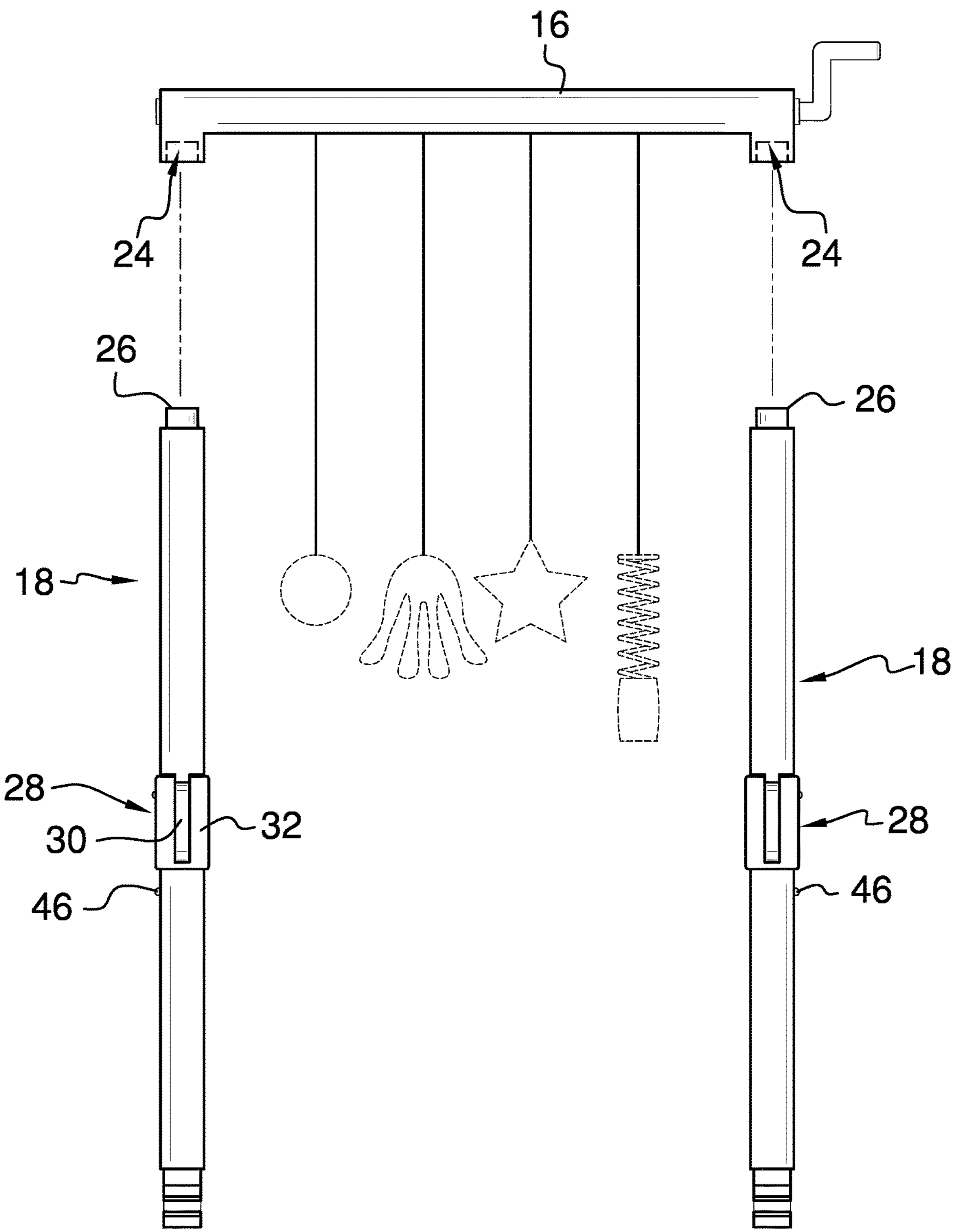
FIG. 3 is an exploded perspective view of an embodiment of the disclosure.
Figure 4:
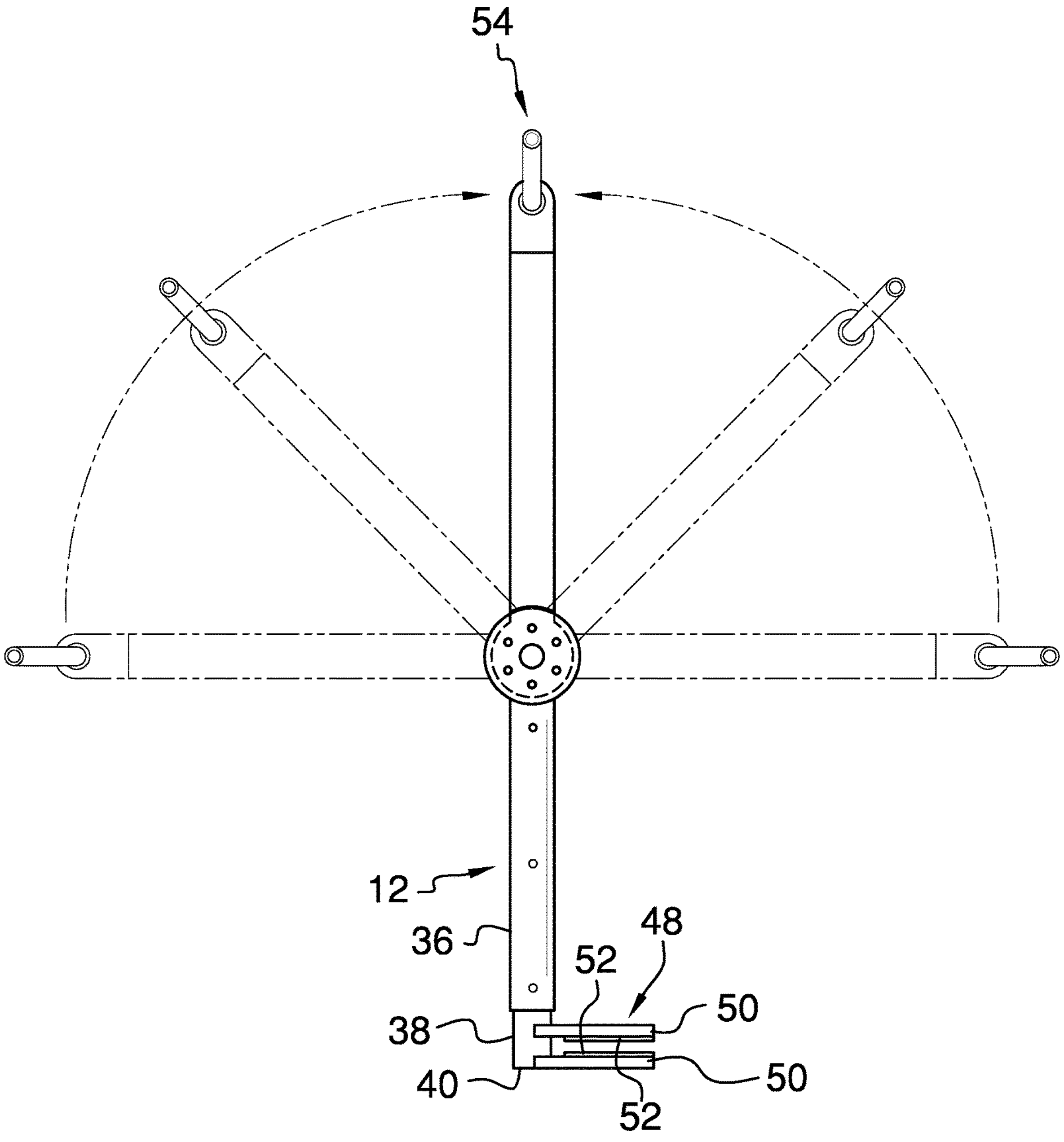
FIG. 4 is a right side view of an embodiment of the disclosure.
Figure 5:
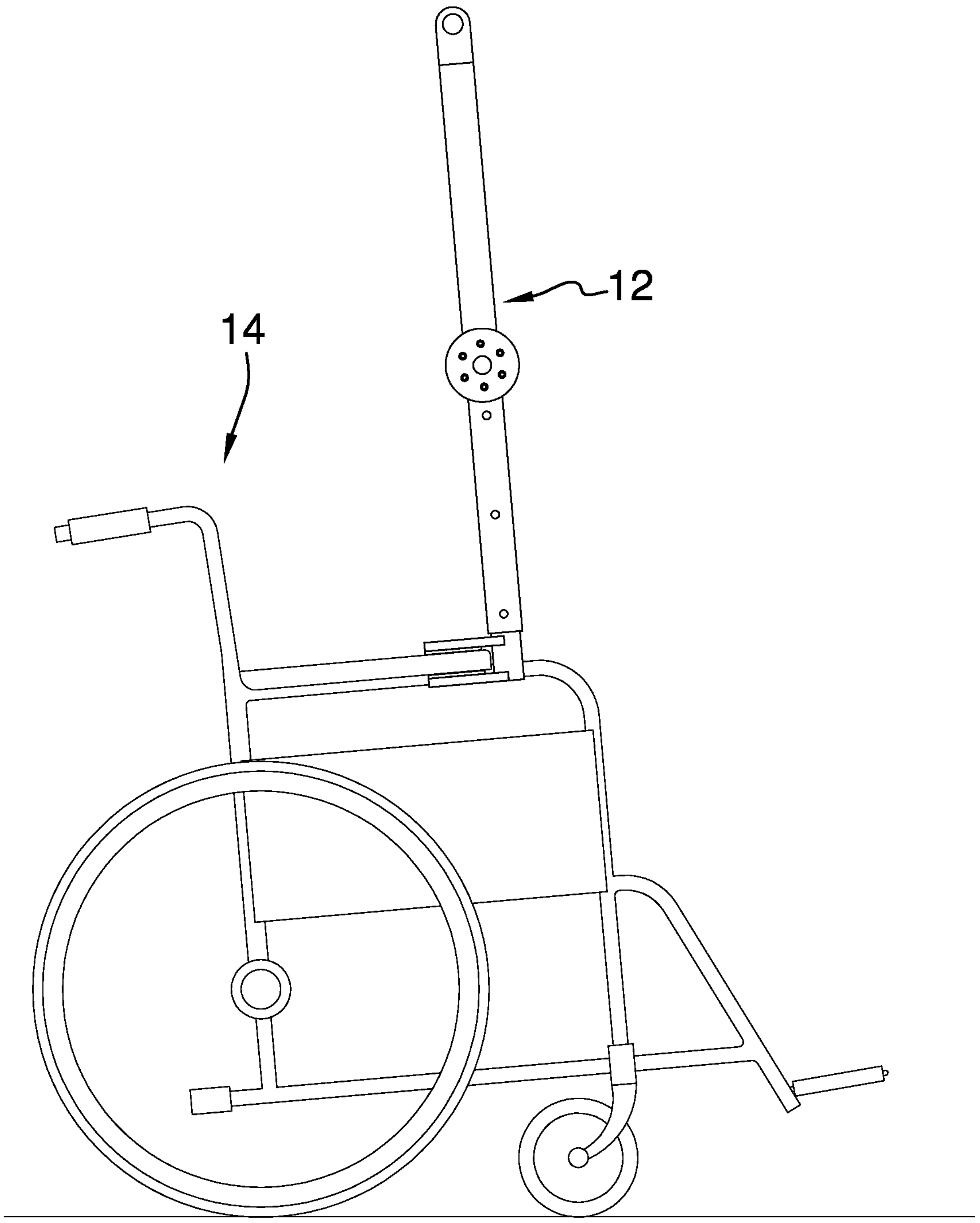
FIG. 5 is a perspective in-use view of an embodiment of the disclosure.

With reference now to the drawings, and in particular to FIGS. 1 through 5 thereof, a new entertainment device embodying the principles and concepts of an embodiment of the disclosure and generally designated by the reference numeral 10 will be described.

As best illustrated in FIGS. 1 through 5, the child entertainment assembly 10 generally comprises a frame 12 that is mountable to a wheelchair 14 such that the frame 12 extends over a child that is seated in the wheelchair 14. The wheelchair 14 may be a children's wheelchair of any conventional design. Additionally, the frame 12 can be mounted to any object commonly employed in the care of children, such as a stroller, a high chair or a walker. The frame 12 comprises a central member 16 extending between a pair of outward members 18. Each of the outward members 18 comprises a first section 20 that is pivotally coupled to a second section 22 such that the first section 20 and the second section 22 that is positionable at a variety of angles with respect to each other. As is most clearly shown in FIG. 3, the first section 20 of each of the outward members 18 is removably attachable to the central member 16. The central member 16 might include a pair of sockets 24 and each of the outward members 18 may include a plug 26 that engages a respective socket 24.

A pair of pivots 28 is included, and each of the pivots 28 includes a primary portion 30 that rotatably engages a secondary portion 32. The first section 20 of each of the outward members 18 is coupled to the primary portion 30 of a respective pivot 28. The second section 22 of each of said outward members 18 is coupled to the secondary portion 32 of a respective pivot 28. In this way the first section 20 and the second section 22 of each of the outward members 18 is pivotally coupled together. The pivots 28 may include a plurality of stops 34 for retaining the first section 20 at a plurality of predetermined angles with the second section 22.

The second section 22 of each of the outward members 18 comprises a first portion 36 that slidably engages a second portion 38 such that the second section 22 of each of the outward members 18 has a telescopically adjustable height. The second portion 38 of the second section 22 of each of the outward members 18 has a bottom end 40. The first portion 36 of the second section 22 of each of the outward members 18 has a plurality of apertures 42 each extending into an interior of the first portion 36. Additionally, the apertures 42 are spaced apart from each other and are distributed along a length of the first portion 36. The central member 16 is hollow and the central member 16 has a plurality of openings 44 each extending into an interior of the central member 16. The openings 44 are spaced apart from each other and are distributed along the central member 16.

A pair of locks 46 is each movably integrated into the second portion 38 of the second section 22 of a respective one of the outward members 18. Each of the locks 46 engages a respective one of the apertures 42 in the first portion 36 of the second section 22 of the respective outward member for retaining the first portion 36 and the second portion 38 at a selected height. Each of the locks 46 may comprise a ball that is biased outwardly from the second portion 38 or the like.

A pair of clamps 48 is each of the clamps 48 is coupled to the frame 12 and each of the clamps 48 can engage the wheelchair 14 for mounting the frame 12 on the wheelchair 14. Each of the clamps 48 extends laterally away from the second portion 38 of the second section 22 of a respective one of the outward members 18, and the clamps 48 are positioned adjacent to the bottom end 40 of the second portion 38. Each of the clamps 48 comprises a pair of jaws 50 that are biased together to compress against a structural element of the wheelchair 14. Each of the jaws 50 may include pads 52 that are directed toward each other and each of the pads 52 may be comprised of a compressible material to enhance gripping the frame 12.

A winch 54 is provided and the winch 54 is rotatably integrated into the frame 12. The winch 54 is rotatable in a first direction or a second direction. The winch 54 includes a rod 56 that extends through the central member 16 of the frame 12. The rod 56 is oriented to extend along a substantial length of the central member 16. Additionally, the winch 54 includes a handle 58 that extends outwardly from the central member 16 thereby facilitating the handle 58 to be gripped by a user for rotating the winch 54.

A plurality of cables 60 is each coupled to the winch 54 and each of the cables 60 extends outwardly through the central member 16. Each of the cables 60 is drawn into the central member 16 when the winch 54 is rotated in the first direction. Conversely, each of the cables 60 extends outwardly from the central member 16 when the winch 54 is rotated in the second direction. Each of the cables 60 is attached to the rod 56, each of the cables 60 extends through a respective one of the openings 44 in the central member 16, and each of the cables 60 has a distal end 62 with respect to the central member 16. Each of the cables 60 may comprise string, plastic or other suitably flexible material that is safe for use around children.

A plurality of toys 64 is each coupled to a respective one of the cables 60 such that each of the toys 64 is accessible to the child that is seated in the wheelchair 14. Each of the toys 64 is drawn upwardly toward the central member 16 when the winch 54 is rotated in the first direction. Conversely, each of the toys 64 is lowered from the central member 16 when the winch 54 is rotated in the second direction. In this way the toys 64 can be positioned at a variety of heights to facilitate the child to most easily access the toys 64. Each of the toys 64 is coupled to the distal end 62 of the respective cable 60, and the plurality of toys 64 may include, but not be limited to, geometric shapes associated with a mobile, action figures, noise makers and other toys preferred by toddlers and infants.

In use, the clamps 48 are engaged on the frame 12 of the wheelchair 14 and the first section 20 of each of the outward members 18 is positioned in a preferred angle to position the central member 16 at a preferred orientation with respect to the child in the wheelchair 14. The winch 54 is rotated in either the first direction or the second direction to position the toys 64 at a preferred height. In this way the toys 64 can be optimally positioned for the child to access while the child is seated in the wheelchair 14. The first section 20 of each of the outward members 18 can be positioned at a preferred angle to facilitate the child to be removed from the wheelchair 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A child entertainment assembly for mounting to a wheelchair thereby facilitating suspended toys to be accessible to a child in the wheelchair, said assembly comprising:

a frame being mountable to a wheelchair wherein said frame is configured extend over a child that is seated in the wheelchair;

a pair of clamps, each of said clamps being coupled to said frame wherein each of said clamps is configured to engage the wheelchair for mounting said frame on the wheelchair;

a winch being rotatably integrated into said frame, said winch being rotatable in a first direction or a second direction;

a plurality of cables, each of said cables being coupled to said winch, each of said cables extending outwardly through a central member of said frame, each of said cables being drawn into said central member when said winch is rotated in said first direction, each of said cables extending outwardly from said central member when said winch is rotated in said second direction; and a plurality of toys, each of said toys being coupled to a respective one of said cables wherein each of said toys is configured to be accessible to the child that is seated in the wheelchair, each of said toys being drawn upwardly toward said central member when said winch is rotated in said first direction, each of said toys being lowered from said central member when said winch is rotated in said second direction.

2. The assembly according to claim 1, wherein said central member extends between a pair of outward members, each of said outward members comprising a first section being pivotally coupled to a second section such that, said first section and said second section is positionable at a variety of angles with respect to each other, said first section of each of said outward members being removably attachable to said central member.

3. The assembly according to claim 2, wherein said second section of each of said outward members comprises a first portion slidably engaging a second portion such that said second section of each of said outward members has a telescopically adjustable height, said second portion of said second section of each f said outward members having a bottom end.

4. The assembly according to claim 3, wherein said first portion of said second section of each of said outward members has a plurality of apertures each extending into an interior of said first portion, said apertures being spaced apart from each other and being distributed along a length of said first portion.

5. The assembly according to claim 4, further comprising a pair of locks, each of said locks being movably integrated into said second portion of said second section of a respective one of said outward members, each of said locks engaging a respective one of said apertures in said first portion of said second section of said respective outward member for retaining said first portion and said second portion at a selected height.

6. The assembly according to claim 2, wherein said central member is hollow, said central member having a plurality of openings each extending into an interior of said central member, said openings being spaced apart from each other and being distributed along said central member.

7. The assembly according to claim 3, wherein each of said clamps extends laterally away from said second portion of said second section of a respective one of said outward members, said clamps being positioned adjacent to said bottom end of said second portion, each of said clamps comprising a pair of jaws being biased together wherein each of said jaws is configured to compress against a structural element of the wheelchair.

8. The assembly according to claim 6, wherein said winch includes a rod extending through said central member of said frame, said rod being oriented to extend along a substantial length of said central member, said winch including a handle extending outwardly from said central member wherein said handle is configured to be gripped by a user for rotating said winch.

9. The assembly according to claim 8, wherein each of said cables is attached to said rod, each of said cables extending through a respective one of said openings in said central member, each of said cables having a distal end with respect to said central member.

10. A child entertainment assembly for mounting to a wheelchair thereby facilitating suspended toys to be accessible to a child in the wheelchair, said assembly comprising:

a frame being mountable to a wheelchair wherein said frame is configured to extend over a child that is seated in the wheelchair, said frame comprising a central member extending between a pair of outward members, each of said outward members comprising a first section being pivotally coupled to a second section such that said first section and said second section is positionable at a variety of angles with respect to each other, said first section of each of said outward members being removably attachable to said central member, said second section of each of said outward members comprising a first portion slidably engaging a second portion such that said second section of each of said outward members has a telescopically adjustable height, said second portion of said second section of each of said outward members having a bottom end, said first portion of said second section of each of said outward members having a plurality of apertures each extending into an interior of said first portion, said apertures being spaced apart from each other and being distributed along a length of said first portion, said central member being hollow, said central member having a plurality of openings each extending into an interior of said central member, said openings being spaced apart from each other and being distributed along said central member;

a pair of locks, each of said locks being movably integrated into said second portion of said second section of a respective one of said outward members, each of said locks engaging a respective one of said apertures in said first portion of said second section of said respective outward member for retaining said first portion and said second portion at a selected height;

a pair of clamps, each of said clamps being coupled to said frame wherein each of said clamps is configured to engage the wheelchair for mounting said frame on the wheelchair, each of said clamps extending laterally away from said second portion of said second section of a respective one of said outward members, said clamps being positioned adjacent to said bottom end of said second portion, each of said clamps comprising a pair of jaws being biased together wherein each of said jaws is configured to compress against a structural element of the wheelchair;

a winch being rotatably integrated into said frame, said winch being rotatable in a first direction or a second direction, said winch including a rod extending through said central member of said frame, said rod being oriented to extend along a substantial length of said central member, said winch including a handle extending outwardly from said central member wherein said handle is configured to be gripped by a user for rotating said winch;

a plurality of cables, each of said cables being coupled to said winch, each of said cables extending outwardly through said central member, each of said cables being drawn into said central member when said winch is rotated in said first direction, each of said cables extending outwardly from said central member when said winch is rotated in said second direction, each of said cables being attached to said rod, each of said cables extending through a respective one of said openings in said central member, each of said cables having a distal end with respect to said central member; and a plurality of toys, each of said toys being coupled to a respective one of said cables wherein each of said toys is configured to be accessible to the child that is seated in the wheelchair, each of said toys being drawn upwardly toward said central member when said winch is rotated in said first direction, each of said toys being lowered from said central member when said winch is rotated in said second direction, each of said toys being coupled to said distal end of said respective cable.

* * * * *